US009728823B2

(12) United States Patent
Fees et al.

(10) Patent No.: US 9,728,823 B2
(45) Date of Patent: Aug. 8, 2017

(54) BATTERY FOR A VEHICLE AND METHOD FOR PRODUCING A BATTERY

(75) Inventors: Heiner Fees, Bietigheim-Bissingen (DE); Andreas Track, Sachsenheim (DE); Ralf Maisch, Abstatt (DE)

(73) Assignee: AUDI AG, Ingolstadt (DE)

( * ) Notice: Subject to any disclaimer, the term of this patent is extended or adjusted under 35 U.S.C. 154(b) by 134 days.

(21) Appl. No.: 14/122,985

(22) PCT Filed: May 18, 2012

(86) PCT No.: PCT/EP2012/002130
§ 371 (c)(1),
(2), (4) Date: Nov. 27, 2013

(87) PCT Pub. No.: WO2012/163484
PCT Pub. Date: Dec. 6, 2012

(65) Prior Publication Data
US 2014/0093766 A1 Apr. 3, 2014

(30) Foreign Application Priority Data

May 28, 2011 (DE) ........................ 10 2011 102 765

(51) Int. Cl.
*H01M 10/613* (2014.01)
*H01M 10/625* (2014.01)
(Continued)

(52) U.S. Cl.
CPC ..... *H01M 10/5016* (2013.01); *H01M 10/049* (2013.01); *H01M 10/613* (2015.04);
(Continued)

(58) Field of Classification Search
CPC ......... H01M 10/5057; H01M 10/5016; H01M 6/5038
(Continued)

(56) References Cited

U.S. PATENT DOCUMENTS

2007/0178377 A1* 8/2007 Kim ..................... H01M 2/021
429/152
2007/0259258 A1 11/2007 Buck
(Continued)

FOREIGN PATENT DOCUMENTS

DE 102007010739 8/2008
DE 102007010745 8/2008
(Continued)

OTHER PUBLICATIONS

International Search Report issued by the European Patent Office in International Application PCT/EP2012/002130 on Jul. 17, 2012.

*Primary Examiner* — Alix Eggerding
(74) *Attorney, Agent, or Firm* — Henry M. Feiereisen LLC

(57) ABSTRACT

The invention relates to a battery (10) for a vehicle. Said battery comprises a plurality of battery cells (12), which are arranged in a housing (16, 18, 20) of the battery (10), and also a cooling device (22, 24) for dissipating heat from the battery cells (12). A material (32), which takes up a first volume in a basic state and takes up a volume which is greater than the first volume in an expanded state, is introduced between the housing (20) and the cooling device (22, 24). The cooling device (22, 24) is pressed against the battery cells (12) by the material (32) which has changed over to its expanded state. The invention also relates to a method for producing a battery (10) of this kind.

6 Claims, 4 Drawing Sheets

(51) Int. Cl.
  *H01M 10/04* (2006.01)
  *H01M 10/6556* (2014.01)
  *H01M 10/6554* (2014.01)
  *H01M 10/647* (2014.01)
  *H01M 10/6567* (2014.01)

(52) U.S. Cl.
  CPC ..... *H01M 10/625* (2015.04); *H01M 10/6554* (2015.04); *H01M 10/6556* (2015.04); *H01M 10/647* (2015.04); *H01M 10/6567* (2015.04); *Y10T 29/49108* (2015.01)

(58) Field of Classification Search
  USPC .......................................................... 429/120
  See application file for complete search history.

(56) References Cited

U.S. PATENT DOCUMENTS

| | | | | |
|---|---|---|---|---|
| 2009/0142628 | A1* | 6/2009 | Okada | H01M 2/0237 429/8 |
| 2010/0104936 | A1 | 4/2010 | Meintschel et al. | |
| 2010/0167115 | A1* | 7/2010 | Okada | H01M 2/1077 429/99 |
| 2010/0291428 | A1* | 11/2010 | Graban | H01M 2/1072 429/120 |
| 2011/0159339 | A1 | 6/2011 | Gregor et al. | |
| 2011/0267778 | A1 | 11/2011 | Eckstein et al. | |
| 2012/0003508 | A1* | 1/2012 | Narbonne et al. | 429/8 |
| 2012/0115003 | A1* | 5/2012 | Park | H01M 2/105 429/120 |
| 2013/0071700 | A1* | 3/2013 | Hsu et al. | 429/50 |

FOREIGN PATENT DOCUMENTS

| | | | |
|---|---|---|---|
| DE | 102007021293 | | 11/2008 |
| DE | 102008034875 | | 1/2010 |
| DE | 102008037039 | | 2/2010 |
| DE | 102008059953 | | 6/2010 |
| DE | 102008059954 | | 6/2010 |
| DE | 102008059971 | | 6/2010 |
| DE | 102009004543 | | 7/2010 |
| DE | 10 2011 003 535 | | 8/2012 |
| EP | 2 065 963 | | 6/2009 |
| JP | 2008103248 | * | 5/2008 .............. H01M 2/10 |

* cited by examiner

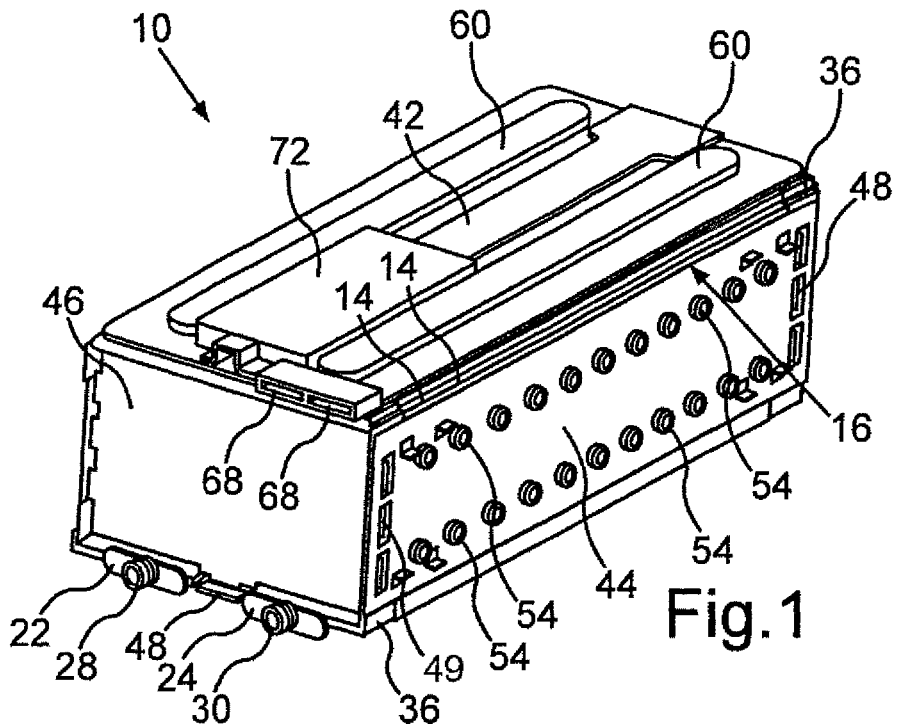
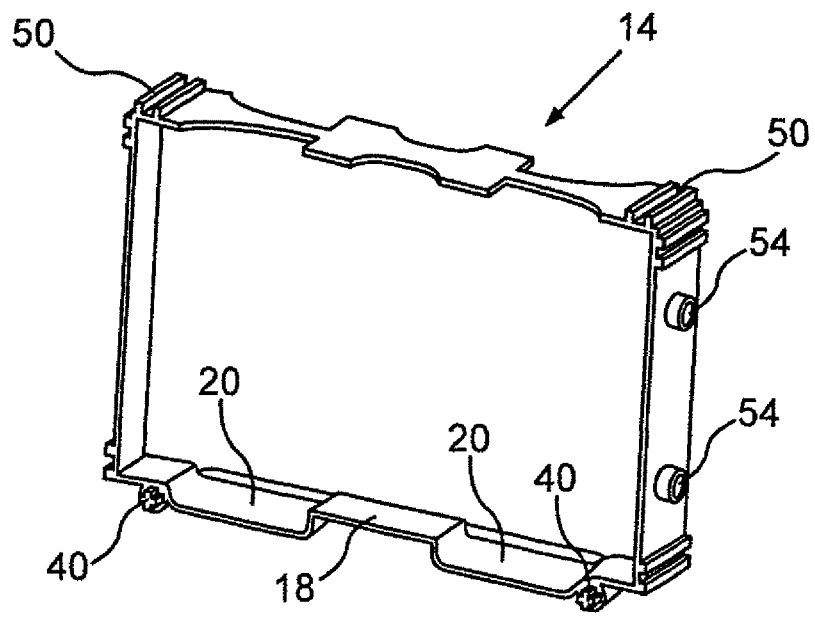

BATTERY FOR A VEHICLE AND METHOD FOR PRODUCING A BATTERY

CROSS-REFERENCES TO RELATED APPLICATIONS

This application is the U.S. National Stage of International Application No. PCT/EP2012/002130, filed May 18, 2012, which designated the United States and has been published as International Publication No. WO 2012/163484 and which claims the priority of German Patent Application, Serial No. 10 2011 102 765.7, filed May 28, 2011, pursuant to 35 U.S.C. 119(a)-(d).

BACKGROUND OF THE INVENTION

The invention relates to a battery for a vehicle, with a plurality of battery cells being arranged in a housing. The battery includes a cooling device for removing heat from the battery cells. Furthermore, the invention relates to a method for producing such a battery.

DE 10 2007 021 293 A1 describes a battery for an electric vehicle, fuel cell vehicle or hybrid vehicle. Individual battery cells which are combined to form a cell stack are surrounded on the outside by a common housing of plastic. The housing includes a container which is open on one side and a lid which closes the container, with both being manufactured by injection molding. To ensure that the battery cells are fixed in place and secured without play in the housing, positioning protrusions are provided on the bottom and the lid of the housing and have zones of different elasticity. The softer zone of a respective positioning protrusion enables a compensation of manufacturing tolerances of the battery cells. The batteries are cooled by pipes in the housing which are supplied with cooling fluid. Mounted to the pipes are numerous thin sheets which are used to remove heat from the battery cells. The sheets are shaped to suit the respective battery cell, with a respective battery cell being accommodated in a receiving space which is formed by one or more sheets.

DE 10 2009 004 543 A1 describes a vehicle battery with round cells arranged between two cooler walls. Cooling channels for a coolant are provided in the cooler walls. Profile elements of heat-conducting material are provided between the battery cells so as to enable a heat transfer between the round cells via the profile elements. Tensioning devices tension together the two cooler walls so as to press them with comparably great force against the profile parts and the round cells.

EP 2 065 963 A2 describes a battery for a vehicle, with a plurality of battery cells forming a battery block. A cooling plate is in thermal contact with a bottom of the battery block. The cooling plate has a hollow space within which cooling pipes are arranged. The cuboid cooling plate with the hollow space includes an upper wall which is in contact with the bottom of the battery block. The expansion of a plastic foam filled in the hollow space causes an intimate contact of the cooling pipes with the upper wall of the cooling plate.

Establishing a good heat-conducting contact of the cooling device with the battery cells is fairly complicated in these batteries that are known in the art.

SUMMARY OF THE INVENTION

It is therefore an object of the invention to provide both a battery of the afore-mentioned type and a method for manufacturing such a battery that are capable to realize a good heat removal during cooling operation in a particularly simple manner.

According to one aspect of the invention, this object is achieved by a battery for a vehicle, including a plurality of battery cells arranged in a housing, and a cooling device for removing heat from the battery cells, wherein a material is introduced in a gap provided between the housing and the cooling device and occupies in a basic state a first volume and in an expanded state a volume which is greater than the first volume, with the cooling device being pressed against the battery cells as the material changes to its expanded state.

According to another aspect of the invention, this object is achieved by a method for producing a battery for a vehicle, wherein a plurality of battery cells is arranged in a housing of the battery, and a cooling device is arranged in the housing and configured to remove heat from the battery cells, wherein a material is introduced into a gap between the housing and the cooling device, with the material undergoing an increase in volume to thereby press the cooling device against the battery cells.

Advantageous configurations with suitable refinements of the invention are set forth in the dependent patent claims.

The battery according to the invention includes a material which is introduced between the housing and the cooling device and which occupies in a basic state a first volume and in an expanded state a volume which is greater than the first volume. As the material changes to its expanded state, the cooling device is pressed against the battery cells. Such a material, also called expansion agent, is capable to realize a particularly good contact of the cooling device upon the battery cells. This, in turn, results during operation of the cooling device in a particularly good dissipation of heat released by the battery cells.

The introduction of the expansion agent in a gap between the housing and the cooling device is also especially easy to implement so that the battery can be manufactured in an especially simple manner. The increase in volume of the expansion agent after introduction between the housing and the cooling device results in a great contact pressure to urge the cooling device in contact with the battery cells.

According to an advantageous configuration of the invention, the material involves a rigid foam material when assuming its expanded and hardened state. Such a foam material, such as in the form of an assembly foam, can be introduced between the housing and the cooling device in an especially simple manner. The assembly foam involves for example a single-component assembly foam or a two-component assembly foam which can be made available cost-effectively and is easy to handle.

The cooling device includes, preferably, at least one profile part through which a coolant can flow. Such a profile part can be made in an especially simple and cost-effective manner by extrusion and the coolant provides a particularly efficient heat removal during operation of the cooling device.

It has been shown as advantageous when a heat-conducting paste is arranged between the at least one profile part and a sheathing of the respective battery cell. As a result, manufacturing tolerances of the battery cells and/or the cooling device and/or the housing can be compensated in a particularly good way. The heat-conducting paste provides in addition a wide-area contact of the cooling device upon the battery cells and prevents the presence of thermally insulating air between the sheathing of the battery cells and the cooling device.

In addition, or as an alternative, a heat-conducting adhesive may be arranged between the profile part and the sheathings of the battery cells. This ensures during the cooling operation an especially good heat transfer from the battery cells onto the cooling device not only but also a particularly reliable hold of the profile parts on the sheathings of the battery cells.

According to a further advantageous configuration, the at least one profile part is made from an aluminum alloy. This material provides an especially good heat transfer from the battery cells onto the coolant. Moreover, a profile part of an aluminum alloy has, advantageously, little weight.

The profile part may also be made from a non-destructive flexible plastic. The battery may also include at least one profile part of an aluminum alloy and at least one profile part of plastic. When the battery includes a profile part of non-destructive, deformable, especially elastic plastic, the risk of damage to the profile part is especially slight when the battery exposed to a force in the event of an accident. Thus, when exposed to a force, the battery cells may be displaced in relation to the cooling device, without experiencing a buckling or breaking of the profile part. As a result, coolant is effectively prevented from escaping the cooling device.

In addition, when using plastic for the profile part a more even heat removal across the entire battery is realized because of a heat transfer coefficient that is lower than of metal. A profile part with great heat transfer coefficient causes comparably intense heating of the coolant by the battery cells arranged upstream so that a less efficient heat dissipation is established for the battery cells arranged downstream in view of the smaller temperature differential.

It has been shown as further advantageous, when at least one wall of the housing of the battery is formed by separators which insulate the battery cells electrically from one another. As they are provided anyway for electrical isolation, the separators, can be used to form the housing so that the battery is especially easy to manufacture. The separators can hereby be especially connected in such a way that the at least one wall of the housing is hermetically sealed against water and/or moisture, especially air humidity. This may be ensured by bonding the separators with one another.

Finally, it has been shown as advantageous, when the at least one wall forms at least one receiving space for the cooling device. The cooling device can then simply be placed during manufacture of the battery in the receiving space which is established as a result of the installation of the separators. Subsequently, the expansion agent placed in the receiving space then provides the respectively great contact pressure by which the cooling device is pressed against the battery cells.

In the method according to the invention for producing a battery for a vehicle, a plurality of battery cells is arranged in a housing of the battery. In addition, a cooling device is arranged in the housing and configured to remove heat from the battery cells. Subsequently, a material is introduced into the gap between the housing and the cooling device, and the cooling device is pressed against the battery cells as the material undergoes an increase in volume. A cooling device in contact with the battery cells is this way results in an especially efficient removal of heat from the battery cells during cooling operation.

The advantages described for the battery according to the invention and preferred embodiments apply also for the method according to the invention for producing a battery.

Both the features and combinations of features mentioned above in the description and the features and combinations of features mentioned hereinafter in the figure description and/or shown in the figures alone can be used not only in the respectively indicted combination but also in other combinations or when taken alone, without departing from the scope of the invention.

BRIEF DESCRIPTION OF THE DRAWING

Further advantages, features and details of the invention are set forth in the claims, the following description of preferred embodiments and with reference to the drawings. It is hereby shown in:

FIG. 1 a perspective view of a battery for storing and supplying drive energy for a vehicle;

FIG. 2 a perspective view of a separator which electrically insulated two battery cells from one another;

DETAILED DESCRIPTION OF PREFERRED EMBODIMENTS

Figure 3:
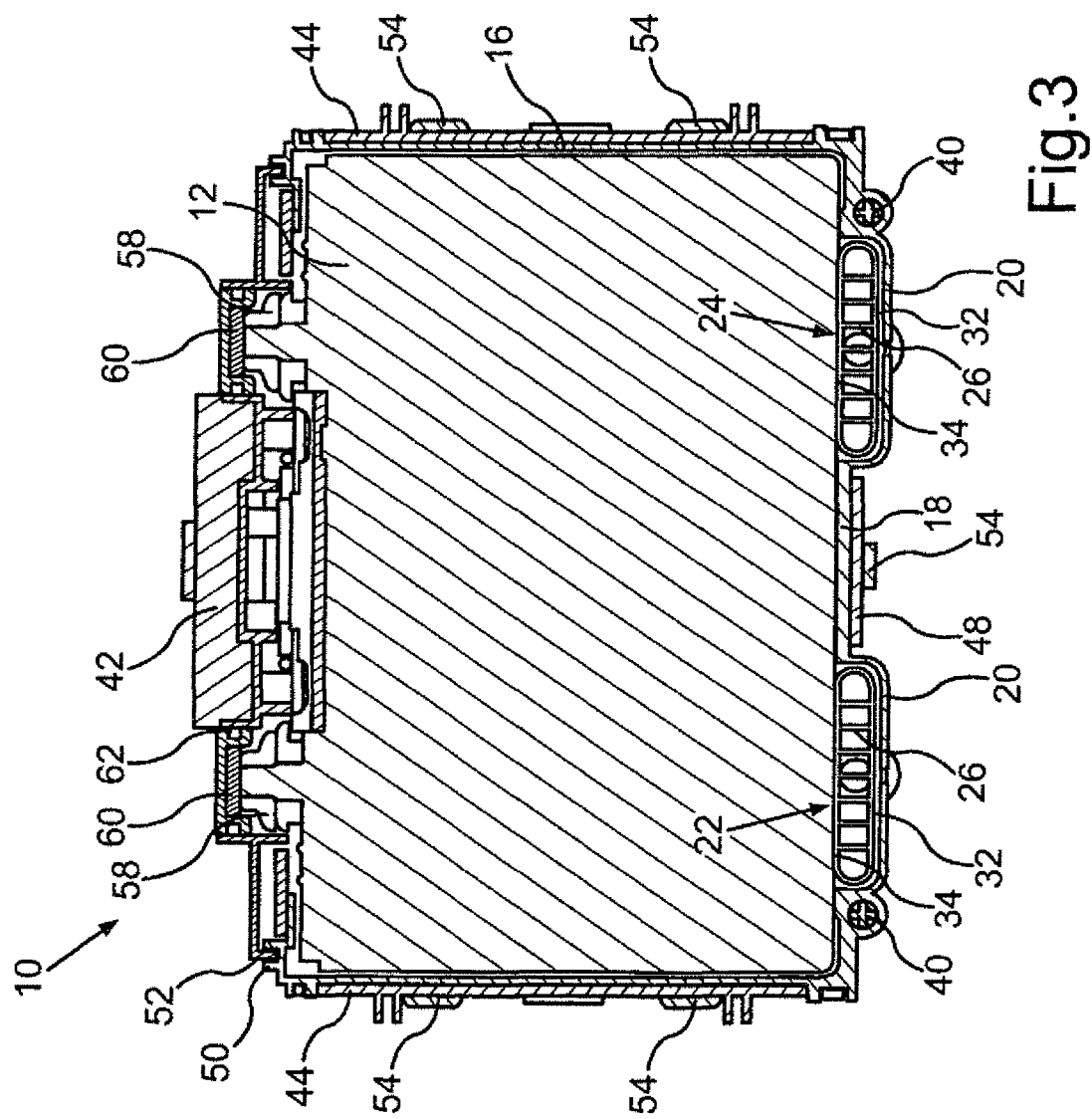
FIG. 3 a sectional view through the battery according to FIG. 1.

A battery 10, shown in FIG. 1 for a vehicle, is formed as a lithium-ion battery for example. The battery 10 includes a plurality of battery cells 12 which are electrically insulated from one another by separators 14 which are made of plastic and also referred to as spacers (cf. FIG. 6). The prismatic battery cells 12 form here a stack.

The separators 14, which are connected with one another by bonding, form side walls 16 and a bottom plate 18 (cf. FIG. 2) of a housing of the battery 10 in which the stack of battery cells 12 is accommodated. In the area of the bottom plate 18 of the housing, as formed by the separators 14, two passages 20 (cf. FIG. 2) are formed by the separators 14 for receiving two profile parts 22, 24 of a cooling device (cf. FIG. 1).

The profile parts 22, 24 are configured as flat tubes through which a coolant flows and in which ribs 26 form a plurality of cooling channels in parallel relationship (cf. FIG. 3). Arranged at a first of the profile parts 22 is a coolant port 28 for supply of the coolant to the profile part 22. A coolant port 30 provided on the second profile part 24 is provided to carry away the heated coolant from the battery 10 to a (not shown) cooler.

FIG. 3 in particular shows that the profile parts 22, 24 have a height which is slightly less than a height of the passages 20 receiving the profile parts 22, 24. An assembly foam 32 is arranged in the region of the passages 20 in a gap between the bottom plate 18, formed by the separators 14, and the profile parts 22, 24.

The assembly foam 32 is introduced during manufacture of the battery 10 in the passages 20 after the profile parts 22, 24 have been placed in the passages 20. The increase in volume of the assembly foam 32 as a result of the expansion of the assembly foam 32 causes the profile parts 22, 24 to be pressed against the sheathings of the battery cells 12 at a great pressing force. The expanded hardened assembly foam. 32 ensures that the great pressing force is maintained continuously.

In addition, a layer of heat conducting paste 34 is provided between the profile parts 22, 24 and the battery cells 12 to compensate tolerances and to ensure an especially good wide-area heat transfer between the profile parts 22, 24.

The profile parts 22, 24 may be made from an aluminum alloy. As an alternative, the profile parts 22, 24 may be made from a flexible, non-destructively bendable plastic so that the profile parts 22, 24 do not buckle or break when the battery 10 is exposed to a force in the event of an accident, and any escape of coolant out of the profile parts 22, 24 is prevented.

When using plastic for the profile parts 22, 24, an especially even heat removal from the battery cells 12 is moreover established because as a result of the comparably low heat transfer coefficient of plastic, there is no large heat input into the coolant by battery cells 12 which are arranged upstream—as viewed in flow direction of the coolant through the coolant port 28.

The housing for the stack of battery cells 12 is formed by the separators 14, respectively arranged between two battery cells 12, and two separators 36 at the end faces to close the stack of battery cells 12 (cf. FIG. 1). The separators 24, 36 made from inherently rigid plastic are bonded to one another at the respective contact areas 38 (cf. FIG. 6).

Figure 4:
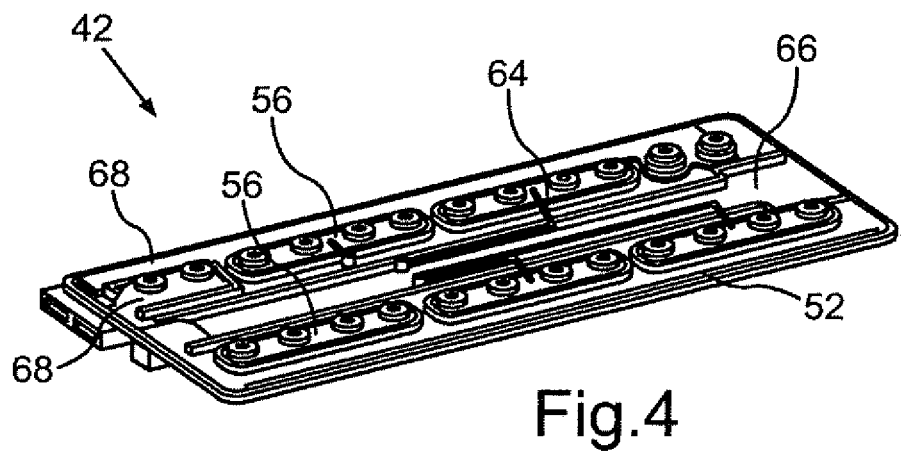
FIG. 4 a bottom view of a lid of the battery to close off the top of a housing, formed by the separators, for the battery cells.

In addition, form-fitting elements, for example pins 40 shown in FIG. 3, are provided in the contact areas 38 and realize with complementary indentations in the separators 14, 36 for a correct positional arrangement of the separators 14, 36 upon one another. The separators 14, 36 bonded to one another form a housing which hermetically seals the stack of the battery cells 12 on five sides, and a lid 42 (cf. FIG. 4) tightly closes the housing at the top against water and moisture.

The integrity of the housing is ensured by side panels 44 and end panels 46 (cf. FIG. 1) which surround the outer circumference of the housing. The end panels 46, made in particular of spring steel, have hereby formed thereon tongues 49 for engagement in respective tabs provided in the side panels 44. A further alignment plate 48 extends at the bottom between the two profile parts 22, 24 from the front end panel 46 in FIG. 1 to the rear end panel and is also secured to the end panels 46.

The joined separators 14 form guide rails 50 for locking lugs 52 (cf. FIG. 3) provided on the lid 42. The locking lugs 52 are bonded in the guide rails 50 with elastic and sealing adhesive (cf. FIG. 4). In this way, the housing is also tight at the top for the stack of battery cells 12.

Formed in one piece with the separators 14 are domes 54 or bushes which extend through respective through openings in the side panels 44 and fixing plate 48 (cf. FIG. 3). In this way, the side panels 44 and the alignment plate 48 maintain predetermined distances between the separators 14 (cf. FIG. 1). The domes 54 are swaged hot after being placed in the through openings to ensure a reliable hold of the side panels 44 and the alignment plate 48.

Integrated in the lid 42 are busbars 56 via which poles of the battery cells 12 are contacted. For this purpose, the busbars 56 can be connected with the poles of the battery cells 12 by screws 58 (cf. FIG. 3). As an alternative, it is possible to fuse the busbars 56 with the poles of the battery cells 12. A cover 60 which is sealed by a seal 62 against a base body of the lid 42 ensures that the screws 58 and the busbars 52 are protected at the top against penetration of moisture or water.

Further integrated in the lid 42 are lines 64 via which the voltage of the battery cells 12 is ascertained. Furthermore, a channel 66 is provided in the lid 42 for discharging hot gases escaping from the battery cells 12 in the event of a malfunction. Electric energy can be drawn from the battery 10 for a drive engine or introduced into the battery 10 via two high-voltage terminals 68 integrated in the lid 42.

Figure 5:
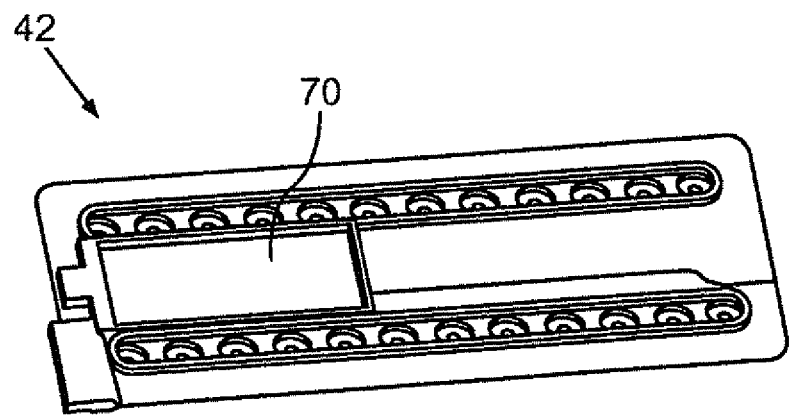
FIG. 5 a top view of the lid according to FIG. 4.
Figure 6:
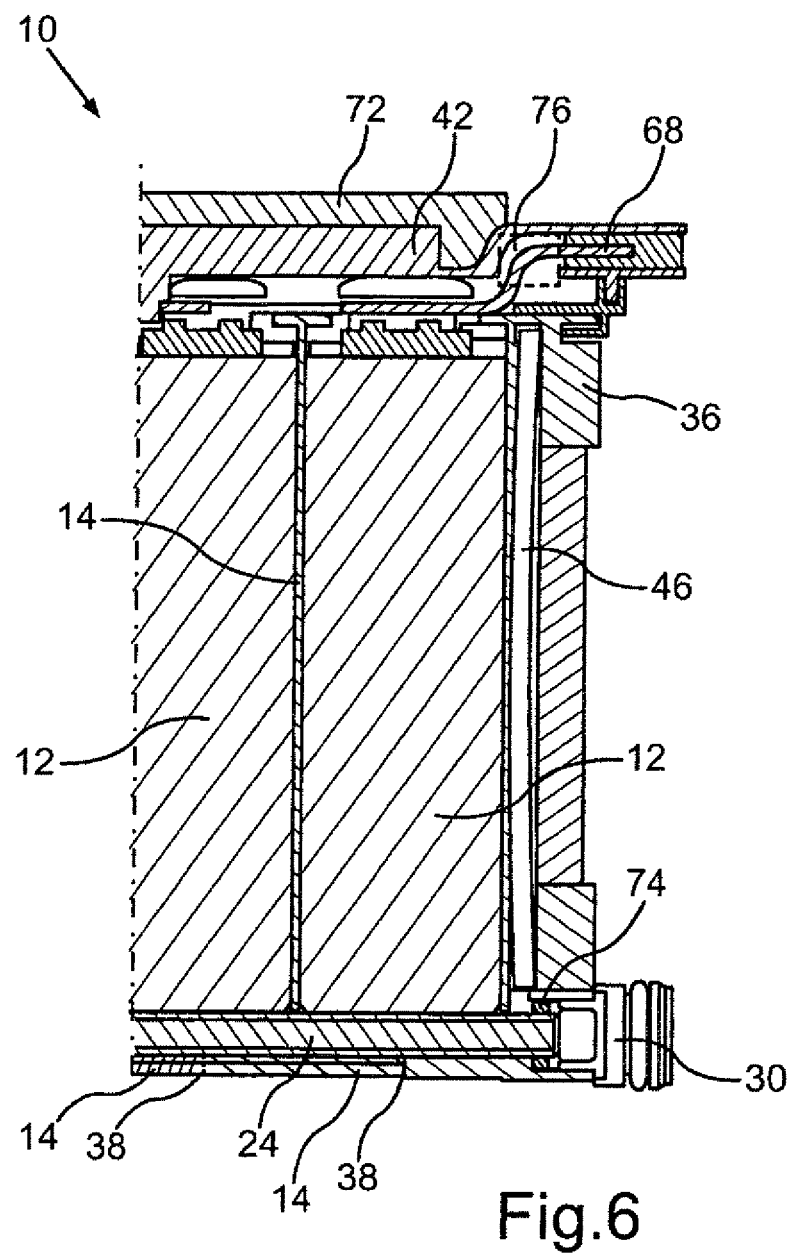
FIG. 6 a further sectional view of a portion of the battery according to FIG. 1.

A sealing casting compound 76 may be provided in a region of the lid 42 in which one end of the high-voltage terminal 68 is arranged and formed as contact finger (cf. FIG. 6). A circuit board 70 (cf. FIG. 5) provided in the lid 42 is covered in the battery 10 at the top also by a cover 72 (cf. FIG. 1).

As is shown in FIG. 6, the coolant port 30 is snugly fitted to the profile part 24, associated to this coolant port 30, via a sealing ring 74 which is arranged in the terminal separator 36. The attachment of the second coolant port 28 to the profile part 22, associated thereto, is realized in an analogous manner.

The invention claimed is:

1. A battery for a vehicle, comprising:
a housing;
a plurality of battery cells arranged in the housing and spaced from one another in a horizontal direction ;
a separator configured to form side walls and a horizontal bottom plate of the housing and to insulate the battery cells from one another, said separator being a single-piece component with said side walls and said bottom plate being of one piece with each other, and said bottom plate being provided with passages spaced from one another in the horizontal direction and located under the battery cells and open upwardly towards the battery cells;
cooling devices each including a profile part through which a coolant flows, with each of the profile parts of each of the cooling devices being received in one of the passages of the bottom plate under the battery cells and configured to remove heat from the battery cells; and
a material introduced in each of the passages of the bottom plate between the bottom plate and the profile part of each of the cooling devices and under the profile part of each of the cooling devices and having in a basic state a first volume and in an expanded state a volume which is greater than the first volume so that the profile part of each of the cooling devices and thereby each of the cooling devices as a whole is pressed upwardly against the battery cells as the material in the passages of the bottom plate under the cooling devices changes to the expanded state.

2. The battery of claim 1, wherein the material is a rigid foam material when the material assumes the expanded state and is hardened.

3. The battery of claim 1, further comprising a heat-conducting paste or a heat-conducting adhesive arranged between the at least one profile part and a sheathing of the battery cells.

4. The battery of claim 1, wherein the at least one profile part is made from an aluminum alloy.

5. The battery of claim 1, wherein the at least one profile part is made from plastic.

6. A method for producing a battery for a vehicle, comprising:
arranging a plurality of battery cells in a housing in a horizontal direction;
electrically insulating the battery cells by separators configured to form side walls and a horizontal bottom plate of the housing, with each of the separators being a one-piece component with the side walls and the bottom plate being of one piece with one another, with the bottom plate provided with passages spaced from one another in the horizontal direction and located under the battery cells and open upwardly towards the battery cells;

arranging cooling devices each including a profile part through which a coolant flows so that each of the profile parts is received in one of the passages of the bottom plate under the battery cells to remove heat from the battery cells;

introducing a material in each of the passages of the bottom plate between the bottom plate and the profile part of each of the cooling device under the profile part of each of the cooling devices; and pressing the profile part of each of the cooling devices and thereby each of the cooling devices as a whole against the battery cells, as the material in the passages of the bottom plate under the cooling devices undergoes an increase in volume.

* * * * *